(12) United States Patent
Baentsch et al.

(10) Patent No.: US 9,041,668 B2
(45) Date of Patent: May 26, 2015

(54) MOBILE TOUCH-GENERATING DEVICE AND COMMUNICATION WITH A TOUCHSCREEN

(75) Inventors: Michael Baentsch, Gross (CH);
Thorsten Kramp, Kilchberg (CH);
Michael Peter Kuyper-Hammond, Kaltbrunn (CH); Thomas D. Weigold, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 13/527,652

(22) Filed: Jun. 20, 2012

(65) Prior Publication Data
US 2012/0326998 A1 Dec. 27, 2012

(30) Foreign Application Priority Data

Jun. 22, 2011 (EP) .................................... 11171035

(51) Int. Cl.
*G06F 3/041* (2006.01)
*G06Q 20/42* (2012.01)
*G06F 21/83* (2013.01)

(52) U.S. Cl.
CPC ............... *G06Q 20/42* (2013.01); *G06F 21/83* (2013.01)

(58) Field of Classification Search
CPC .... G06F 3/041–3/047; G06F 3/0488–3/04886
USPC .................................................. 345/156–184
See application file for complete search history.

(56) References Cited

U.S. PATENT DOCUMENTS

| 6,492,978 B1 * | 12/2002 | Selig et al. ..................... 345/173 |
| 7,575,168 B2 | 8/2009 | Suomela |
| 8,199,114 B1 * | 6/2012 | Jaeger et al. .................. 345/173 |
| 8,368,662 B2 * | 2/2013 | Argiro ........................... 345/173 |
| 8,686,959 B2 * | 4/2014 | Payne ............................ 345/173 |
| 2004/0122771 A1 | 6/2004 | Celi, Jr. et al. |

(Continued)

FOREIGN PATENT DOCUMENTS

DE 10 2007052734 1/2009
EP 0 902 352 3/1999

(Continued)

OTHER PUBLICATIONS

Nitesh Saxena, et al., Secure Device Pairing Based on a Visual Channel, University of California, http://www.usb.org/developer/wusb, pp. 1-17.

(Continued)

*Primary Examiner* — Gene W Lee
(74) *Attorney, Agent, or Firm* — Scully, Scott, Murphy & Presser, P.C.; Jeff Tang, Esq.

(57) ABSTRACT

A mobile touch-generating device having logic and a touch-generating system. The touch-generating system includes one or more touch-generating elements. The touch-generating system is operatively coupled to the logic to generate touch events via the one or more touch-generating elements, the touch events detectable by a touchscreen, such as, a capacitive sensing touchscreen. Also provided are: (i) a method of bidirectional communication between a mobile touch-generating device and a touchscreen device; and (ii) a computer readable non-transitory medium containing a computer program which, when executed, causes a computer to execute the steps of the above method.

13 Claims, 4 Drawing Sheets

(56) References Cited

U.S. PATENT DOCUMENTS

| | | |
|---|---|---|
| 2005/0088417 A1 | 4/2005 | Mulligan |
| 2006/0007179 A1* | 1/2006 | Pihlaja .................. 345/173 |
| 2006/0020559 A1 | 1/2006 | Steinmetz |
| 2006/0256090 A1* | 11/2006 | Huppi .................. 345/173 |
| 2008/0238879 A1 | 10/2008 | Jaeger et al. |
| 2010/0297946 A1 | 11/2010 | Alameh et al. |
| 2011/0081860 A1 | 4/2011 | Brown et al. |
| 2011/0095992 A1 | 4/2011 | Yeh |
| 2011/0121950 A1 | 5/2011 | Izadi et al. |
| 2012/0194457 A1* | 8/2012 | Cannon et al. ............ 345/173 |
| 2013/0135246 A1* | 5/2013 | Aubert et al. ............ 345/174 |

FOREIGN PATENT DOCUMENTS

| | | |
|---|---|---|
| EP | 1551140 A1 | 7/2005 |
| JP | 2005031448 A | 2/2005 |
| JP | 2010044730 A | 2/2010 |
| WO | WO 2009/032522 | 3/2009 |
| WO | WO 2010/039334 | 4/2010 |

OTHER PUBLICATIONS

Nitesh Saxena, et al., Secure Device Pairing Based on a Visual Channel, University of California, http://eprint.iacr.org/2006/050 (Feb. 2006), pp. 1-17.

Saxena et al., "Secure Device Pairing Based on a Visual Channel," University of California, http:www.usb.org/developer/wusb, 2006 IEEE Symposium onSecurity and Privacy, May 21-24, 2006, pp. 1-17.

* cited by examiner

MOBILE TOUCH-GENERATING DEVICE AND COMMUNICATION WITH A TOUCHSCREEN

CROSS REFERENCE TO RELATED APPLICATION

This application claims priority under 35 U.S.C. 119 from European Patent Application Number 11171035.6, filed Jun. 22, 2011, the entire contents of which are incorporated herein by reference

BACKGROUND OF THE INVENTION

1. Field of the Invention

The present invention relates to automated communications with touchscreen devices, e.g., to touchscreen devices using capacitive sensing.

2. Description of Related Art

Personal digital assistants (or PDAs) are generally known, see e.g., Wikipedia contributors, "Personal digital assistant." Wikipedia, The Free Encyclopedia. Wikipedia, The Free Encyclopedia, 18 May 2011, Web. 10 Jun. 2011. PDAs are mobile devices offering personal information manager capabilities. Typically, a PDA has an electronic visual display (or display for short) and more generally various user interfaces. Newer products also have audio capabilities and can be used as mobile phones ("smartphones") or portable media players. Today, almost all PDAs are smartphones. Also, most PDAs have the ability to connect to the Internet and include a web browser. In fact, many PDAs can access the Internet, intranets or extranets via Wi-Fi or Wireless Wide Area Networks.

Many PDAs use touchscreen technology. A touchscreen (or touch-sensitive display) is an electronic display sensing the location of a touch event within the display area. Usually, touching the display is done with a finger. Touchscreens can also sense passive objects such as a stylus. Touchscreens are typically used in devices such as all-in-one computers, tablet computers, PDAs and smartphones, see e.g., Wikipedia contributors. "Touchscreen." Wikipedia, The Free Encyclopedia. Wikipedia, The Free Encyclopedia, 6 Jun 2011. Web. 10 Jun 2011. There are a variety of touchscreen technologies, e.g., resistive, capacitive, infrared, etc.

Capacitive sensing is perhaps the most used technology for PDAs. A capacitive touchscreen panel includes an insulator such as glass, coated with a transparent conductor, e.g., indium tin oxide. Touching the surface of the screen with a conductor (human body is also an electrical conductor) results in a distortion of the electrostatic field of the screen, which can be measured as a change in capacitance.

Security problems with PDAs (just like PCs) make them unsuitable for many functions since data entered by users can be manipulated or copied by an attacker. For example, transactions can be changed to send money to unwanted recipients or to order unwanted goods, or user credentials can be copied providing attackers with access to systems such as those used for Internet banking.

Beyond PDAs, touch-sensitive displays become increasingly prevalent in many electronic devices ranging from smartphones, tablet PCs or Laptops to special purpose devices such as ATM machines. While displays primarily act as human interface devices they can also be used for one-way short-range wireless data communication between two devices. For example, in case of the so-called flicker code application where one device encodes data within a flickering image that is shown on its display and a second device equipped with a photodetector (i.e., having light sensing elements) can then receive and decode this data when such elements are placed close to the flickering image, see e.g. http://www.axsionics.ch/tce/frame/main/422.htm and http://www.reiner-sct.com/index.php?option=content&task=view&id=162.

SUMMARY OF THE INVENTION

According to one aspect of the present invention a mobile touch-generating device includes a logic system and a touch-generating system. The touch-generating system includes at least one touch-generating element and is operatively coupled to the logic system to generate touch events via the touch-generating element(s), the touch events being detectable by a touchscreen.

According to another aspect of the present invention, a system includes a touchscreen device having a touchscreen and a mobile touch-generating device. The touch-generating device includes a logic system and a touch-generating system. The touch-generating system includes at least one touch-generating element. The touch-generating system is configured to generate, via one the touch-generating elements, touch events which are detectable by the touchscreen.

According to yet another aspect of the present invention, a method a method is provided for bidirectional communication between a mobile touch-generating device and a touchscreen device. The mobile touch-generating device is equipped with a detector system operatively coupled to the logic of the mobile touch-generating device, the touchscreen device includes an interface including a touchscreen, and the interface is adapted for communicating with the mobile touch-generating device. The method includes the steps of: issuing at least one instruction to emit a signal via said interface means; and receiving touch events via the touchscreen, the touch events being generated by the mobile touch-generating device.

In a still further aspect of the present invention, a computer program product includes a computer readable non-transitory medium having computer readable program code embodied therein or thereon. The computer readable program code is configured to cause a computer to perform instructions executable by the computer to cause it to execute the steps of the above method.

DETAILED DESCRIPTION OF THE INVENTION

In implementing the first aspect of the present invention summarized above, the touchscreen is preferably a capacitive sensing touchscreen.

Embodiments of the first aspect may include one or more of the following features: the touch-generating system includes at least two touch-generating elements, preferably nine touch-generating elements; the one or more touch-generating elements include respective conductive electrodes and the touch-generating system includes a circuitry connected to the electrodes via one or more switches, allowing for closing the circuitry and draining electrical charge from the electrodes; the mobile touch-generating device further includes a photodetector system operatively coupled to the logic, the logic being furthermore preferably configured to generate the touch events, in response to optical signal detected via the photodetector system; and the mobile touch-generating device is furthermore configured such that the mobile touch-generating device can rest on a touchscreen of a personal digital assistant or PDA, with the touch-generating elements in close proximity with the touchscreen of the PDA. The above list is not exhaustive and other details may be included.

In embodiments of the second aspect of the present invention the touchscreen device is preferably a capacitive sensing touchscreen, and any of the above mobile touch-generating devices can be used. In variants of embodiments of the second aspect, the touchscreen device is preferably a personal digital assistant (PDA) and the mobile touch-generating device is configured such that the mobile touch-generating device can rest on the touchscreen, with the touch-generating elements in close proximity with the touchscreen, and spanning an area smaller than a surface of the touchscreen.

The touchscreen device is preferably configured to display, via the touchscreen, an image modulated in space and/or in time; and the mobile touch-generating device includes a photodetector system operatively coupled to the logic of the mobile touch-generating device to detect the displayed image, the logic being furthermore preferably configured to generate touch events in response to the image detected.

When the present invention is embodied as a method of bidirectional communication between the mobile touch-generating device of any one of the above embodiments and a touchscreen device, wherein the mobile touch-generating device is equipped with a detector system, such as a photodetector system, operatively coupled to the logic of the mobile touch-generating device, and the touchscreen device includes an interface including a touchscreen, the interface being adapted for communicating with the mobile touch-generating device, the method includes: instructing to emit a signal via the interface means; and receiving touch events via the touchscreen, the touch events generated by the mobile touch-generating device. In embodiments, this method may include one or more of the following exemplary features: instructing to emit the signal is carried out in response to receiving the touch events via the touchscreen; the method includes, at a cycle n: receiving via the touchscreen an nth sequence of touch events generated by the mobile touch-generating device and indicative of an nth location of the touch-generating elements; determining an nth location of the mobile touch-generating device according to the nth sequence of touch events received; instructing to emit an nth signal via the interface means, the nth signal having an nth set of characteristics determined according to the nth location of the touch-generating elements; and repeating the steps of receiving, determining and instructing at a cycle n+1; instructing to emit a signal includes instructing to display an image via the touchscreen, the image preferably modulated in space and/or in time; instructing to emit a signal includes instructing to emit a signal having a set of characteristics determined according to both a last determined location and known configuration data of the mobile touch-generating device, the configuration data preferably indicating the arrangement of the detector system vs. the one or more touch-generating elements of the touch-generating system; and the method further includes receiving configuration data pertaining to a configuration of the mobile touch-generating device, the configuration data preferably indicating the arrangement of the detector system vs. the one or more touch-generating elements of the touch-generating system, and receiving configuration data preferably includes: receiving via the touchscreen a sequence of touch events generated by the mobile touch-generating device; and determining the configuration of the mobile touch-generating device according to the sequence received.

According to the final aspect, the present invention is embodied as a non-transitory computer program medium including instructions executable by processing means for executing all the steps of the above methods, preferably within a web application.

Methods, devices and systems embodying the present invention will now be described, by way of non-limiting examples, and in reference to the accompanying drawings.

As an introduction to the following description, it is first pointed at a general aspect of the present invention, directed to a mobile touch-generating device (hereafter "TGD"), i.e., a user device including a touch-generating system. The latter is equipped with one or more touch-generating elements (hereafter "TGEs") and is operatively coupled to logic to generate touch events via the TGEs. The events are such as to be detectable by a touchscreen. The above device allows for automated communication with a touchscreen device.

In embodiments, it can further be provided with detection capabilities (it uses, e.g., a photodetector) to extend the usual display-reading approach for use with touch-sensitive displays and enable bidirectional data communication. Particular implementations are furthermore provided which do not require precise alignment or pre-calibration of the two devices. Various applications may benefit from such a (very) short range wireless communication mechanism, for example, communication with secure tokens for authentication purposes, pairing of devices, etc., as to be discussed in more details below.

Figure 2:
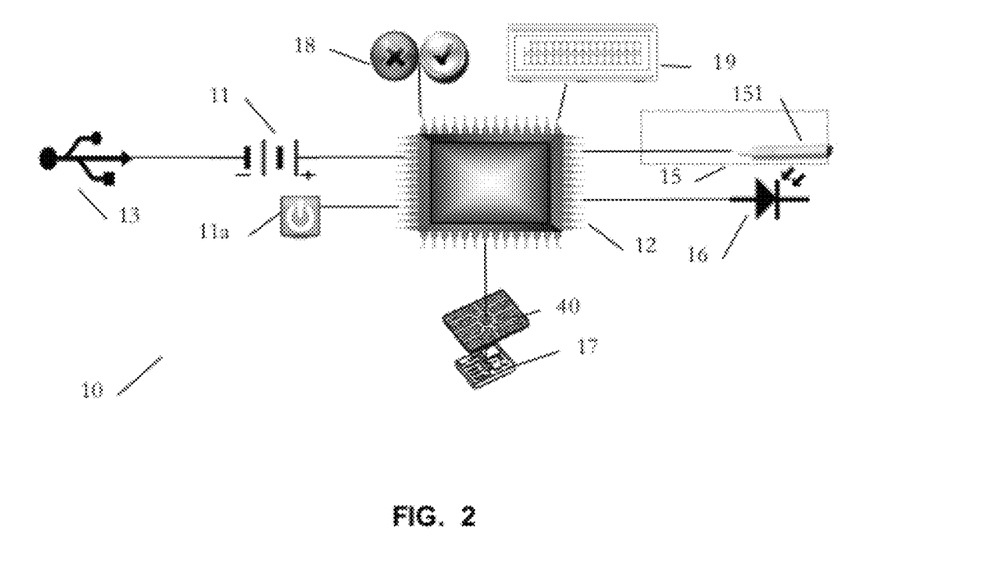
FIG. 2 is a schematic representation of a touchscreen device, according to embodiments.
Figure 4:
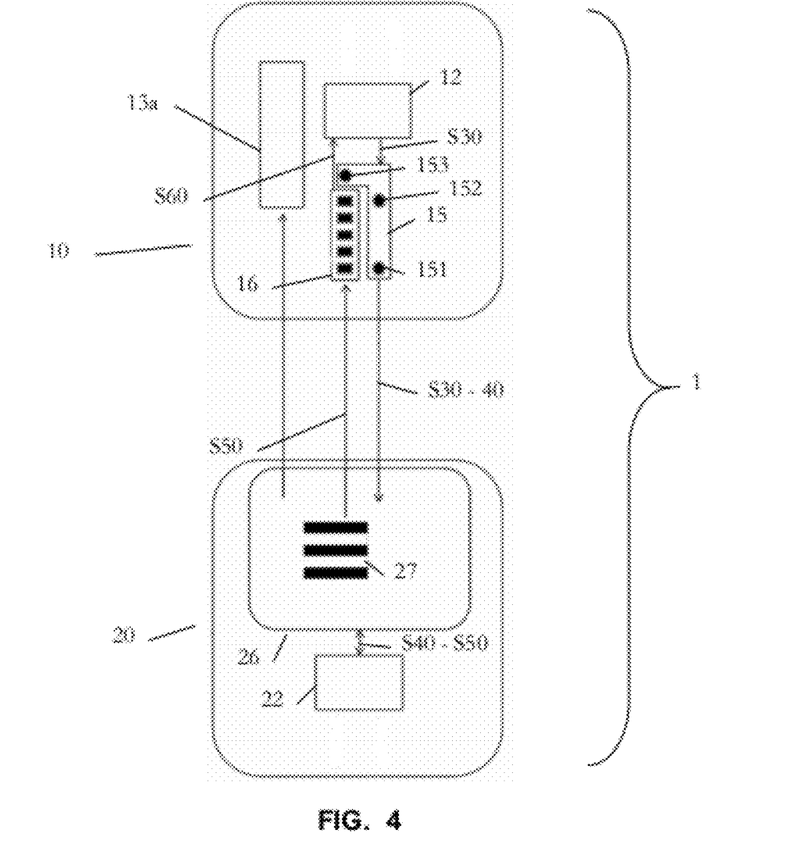
FIG. 4 is a schematic representation of a system including a touchscreen device and a mobile touch-generating device, according to embodiments of the present invention. The mobile touch-generating device depicted corresponds to a variant to the device of FIG. 2.

This TGD can be used together with various types of touchscreen device. Typically, it is designed small and light enough such that it can rest on the touchscreen panel, e.g., of a PDA or a smartphone, with the TGEs in close proximity with the touchscreen. For instance, FIG. 2 schematically represents a mobile TGD, according to a first embodiment. FIG. 4 illustrates another embodiment of a mobile TGD, as one component 10 of a paired system 1 that further includes a touchscreen device 20. FIG. 5 gives typical dimensions for a touch-generating system, meant to be laid on a touchscreen panel Referring in particular to FIG. 2 or 4, the touch-generating system 15 is operatively coupled to a logic 12; it includes one or more TGEs 151-153 for generating touch events to be detected at a touchscreen device 20.

A preferred technology for the touchscreen device 20 is capacitive sensing. Relying on capacitive sensing is advantageous inasmuch as the TGD does not need to include moving parts (i.e., actuated TGEs), which are else mostly required with other technologies. Rather, using capacitive sensing, a TGE may essentially restrict to a conductive electrode 151.

Then, the touch-generating system 15 may essentially consist of a circuitry, e.g., a resistor-capacitor circuit 150 (see FIG. 3) connected to the electrode 151 via an electronic switch. Closing the circuit allows to drain electrical charge from the electrode into the additional capacitance, resulting in a change in capacitance, i.e., a (capacitive) touch event. The circuitry and electrode are for example designed such as to implement a suitable human body capacitive model, together with highly isolating transistors, which ensures compatibility with most capacitive touch screen technologies. This shall be discussed later in details.

The TGE might however work differently in case of other touch display technologies, for instance, via mechanical pressure. Here, actuated fingers might be used in place of switched electrodes, together with electric motors or piezo-electric elements as primary means for creating a mechanical force on the fingers.

Also, referring back to FIG. 2 or 4, the TGD preferably includes a detector system 16 (e.g., with light sensitive elements such as photosensitive diodes), to allow for bidirectional communication with the touchscreen device. In the following, a photodetector 16 is assumed, which solution is preferred in practical implementations.

The photodetector system 16 can be operatively coupled to the logic 12, to read and/or decrypt optical signal displayed at the touchscreen. Typically, the logic 12 is configured to generate touch events in response to optical signal detected via the photodetector 16. Implementation of light-sensitive components is possible with standard electronics components (e.g., light-sensitive resistors or diodes).

As said, the touch-generating system 15 includes at least one TGE. Yet, increasing the number of TGEs allows for increasing the communication bandwidth with the touchscreen device. Also, it makes it possible to increase arbitrariness in the placement of the TGD on the touchscreen. Physical or visual mechanisms can yet be provided to constrain the position of the TGD (e.g., a calibrated placement) on the touchscreen, as to be discussed later. Thus, in principle, only one TGE is enough to permit communication with the touchscreen device.

Preferably, the touch-generating system 15 includes at least two touch-generating elements 151-152, which already allows arbitrariness in the positioning of the touch-generating device, provided that the touchscreen device knows the configuration of the mobile touch-generating device (in particular the arrangement of the detector system 16 vs. the touch-generating elements 151, 152). Note that the configuration may be known by the touchscreen device beforehand or be otherwise available, e.g., from the Internet. It can also be communicated directly by the TGD, as to be discussed later. If only two TGEs are provided, an asymmetrical sequence of touch events sensed at the touchscreen panel allows the touchscreen device to know the orientation of the TGD (and notably on which side of the TGEs the photodetector is). Note that the configuration can otherwise be inferred by the touchscreen device. For instance, if the two TGEs are sensed on a lower portion of the touchscreen, the touchscreen device may assume that the photodetector 16 is located opposite to the line passing through the TGEs, the distance of the photodetector to the segment line being otherwise known, etc. In all cases, the geometrical relationship between the photodetector and the TGEs can be known by an application running on the touchscreen device, e.g., a web application, to determine how the light- and touch-sensitive areas must align.

Preferably, as depicted in FIG. 4, at least three touch-generating elements 151-153 are provided, in an asymmetrical configuration (i.e., not forming an equilateral triangle), whereby more arbitrariness is allowed in the position of the TGD.

More preferably, nine touch-generating elements 151-159 are provided to increase communication bandwidth, as depicted in the example of FIG. 5.

The touch-generating elements and more generally the TGD are typically configured such that touch-generating elements can rest in close proximity with the touchscreen. Also, the touch-generating elements will typically span an area smaller than a surface of a typical touchscreen, e.g., smaller than a PDA display, such that the touchscreen can sense all the TGEs. In addition, if bidirectional communication is contemplated, the effective surface spanned by the TGEs and the photodetector shall fit within the display surface of the touchscreen device.

Figure 5A:
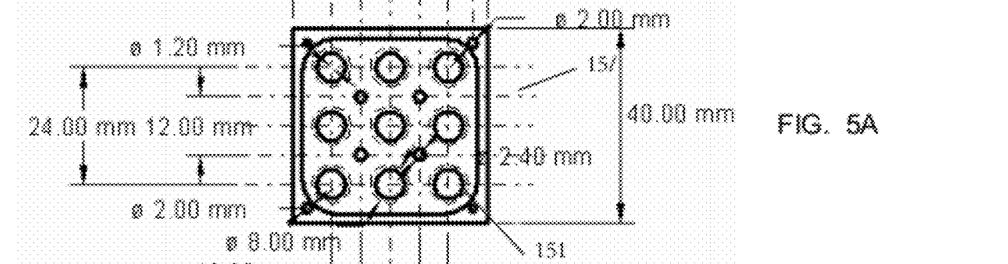
FIG. 5A is a partial projection of a lower part of a touch-generating system, as it looks from the bottom.
Figure 5B:
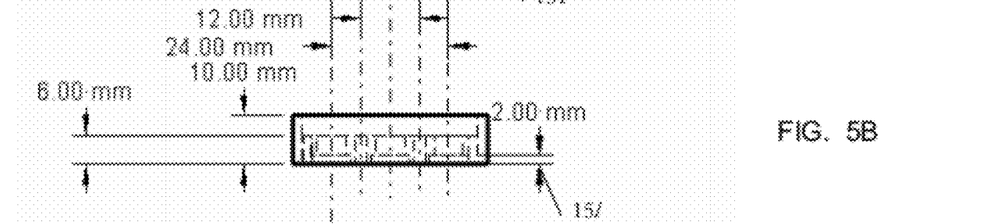
FIG. 5B is a partial projection of a lower part of a touch-generating system, as it looks from the side.
Figure 5C:
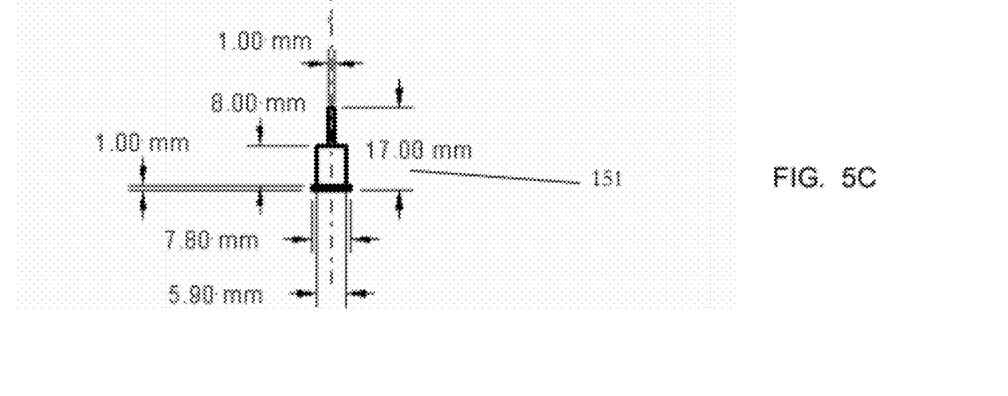
FIG. 5C shows a touch-generating element (conductive electrode) useable in the embodiments shown herein.

In the example of FIG. 5, each TGE essentially includes a conductive electrode (FIG. 5C), i.e., a finger inserted and fixed or hold in a corresponding recess of a body (FIG. 5A, bottom view, FIG. 5B, side view). The dimensions provided in this example are compatible with a number of PDAs' touchscreen panel dimensions. For example, here, the main diameter of a conductive electrode is 5.90 mm, the maximal diameter being 7.80 mm. The touch-generating panel fills a 40.00×40.00 mm area (FIG. 5A). FIG. 5A shows a panel that can host nine electrodes and four photodetectors. The photodetectors can for instance be mounted behind the four small holes located around the electrode in the center of the panel. Such dimensions can obviously be adapted, depending on the type and performances of touchscreen devices and the number of TGEs contemplated. If resolution permits, the maximal diameter of the TGEs can be substantially lowered, e.g., to 1 mm or below.

As already evoked earlier, if a touchscreen technology is used that requires mechanical pressure for generating touch events, mechanically movable fingers connected to electronic actuators can be inserted instead of the conductive electrodes in order to generate pressure when requested by the logic.

Reverting to FIG. 4, the touchscreen device is typically configured to display an image 27 modulated in space and/or in time (e.g., flickering image). Flickering images are advantageous since they allow for designing or reusing communication protocols embedding arbitrary binary information in light signals, e.g., flickering bright (1), dark (0). For example, images 27 may consist of a flickering 1D bar code in black/white, gray scale or color, where one bar defines the clock and the others represent data bits that are transferred per clock signal. An alternative would be the single image of a 2D barcode.

In turn, the mobile TGD may be equipped with a photodetector system 16, also operatively coupled to the logic 12 in order to detect the displayed images. The TGD is placed reasonably close to or in contact with the touch-sensitive display of the touchscreen device such that elements (e.g., photosensitive diodes) of the photodetector can easily read the bars of the flickering image or the barcode.

Also, the logic 12 shall typically generate touch events in response to the image detected. More generally, the touchscreen device 20 may include interface means 26 beyond the touchscreen, enabling communication towards the TGD. Beyond displayed images, other types of signals can be contemplated, e.g., audio, wireless, etc., which may also be envisioned to ensure bidirectional communication.

Advantageously yet, the function of displaying an image is more easily designed within the same application (e.g., a web application) that can otherwise sense the touch events generated by the TGD. In addition, the same application may enable communication to a remote server, e.g., via wireless Internet access.

Typically, each of the logics 12/22 depicted in FIG. 4 includes processing means (or computing means) coupled to a memory, which typically includes both persistent and non-persistent memories. The persistent memory may store e.g., computerized methods as discussed below, which methods are executed by the respective processing means.

Referring back to FIG. 2, the TGD 10 can be provided with at least one interface 13, e.g., a USB interface, for charging a battery 11 of the device and/or communicating with any other USB compatible device, if needed. If necessary, the device 10 has a card reader 17 to read user credentials stored on a memory card 40, e.g., a smart card. Suitable use can safely be made out of such data, e.g., user credentials as stored on the card. In particular, a trustworthy connection can be established between a user (or strictly speaking the TGD 10) and a third party, e.g., a server (not shown), via the touchscreen device 20 and using such data. In a variant, the user credentials may be stored directly on the persistent memory of the secure device. In that respect, one may design or reuse any suitable cryptographic protocol to encode/decode the security-sensitive information to be displayed and signed by the device.

Further interfaces (like control buttons 18 and display 19) may be provided to allow for direct interaction with the user. Also, the device typically includes an on-off switch 11a.

The touch-generating device shown in FIG. 4 corresponds to a variant to the device of FIG. 2. While in FIG. 2, the device 10 is provided with a USB interface, which can be used to charge the device, in FIG. 4, the device 10 is provided with one or more solar cells 13a, to charge a battery (not shown) or directly power the touch-generating system 15, taking advantage of light received e.g., during bidirectional communication between the TGD 10 and the touchscreen device 20. The TGD depicted in FIG. 4 may otherwise include other functionalities similar to those of FIG. 2, i.e., control buttons, display, on-off switch, battery, etc. (not shown).

Figure 1:
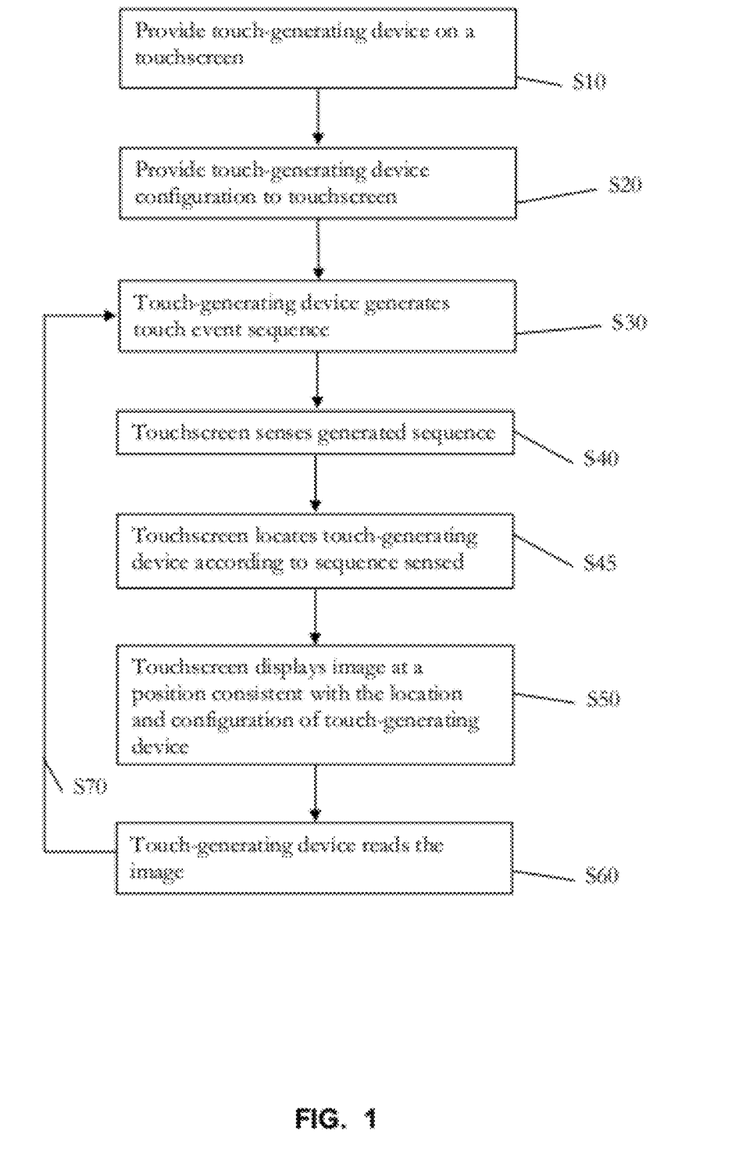
FIG. 1 is a flowchart depicting steps of a method according to embodiments of the present invention.

Turning to the flowchart of FIG. 1, typical steps of a method of bidirectional communication between the mobile device 10 and the touchscreen device 20 are illustrated. Two main steps are:
1. Step S50: the touchscreen device (e.g., a web application thereof) instructs to emit a signal 27 (e.g., an image) via interface means 26; and
2. Step S40: the touchscreen device receives, i.e., senses the touch events that are generated by the mobile TGD.

As said, the mobile TGD is preferably equipped with a detector system 16, preferably a photodetector, to enable bidirectional communication with the touchscreen 20. Note that the above steps can be carried out in any order and form the basis of a bidirectional communication. For example, an image 27 (step S50) is displayed in response to sensing the touch events (step S40). Conversely touch events are generated (step S30) in response to an image 27 being displayed and read at the TGD (step S50).

In particular, the following steps can typically be carried out, at cycle n:
Step S30: an $n^{th}$ sequence of touch events is generated by the TGD, which sequence is indicative of an $n^{th}$ location of the TGEs on (or close to) the touchscreen panel;
Step S40: this sequence is received via the touchscreen panel, i.e., sensed at the touchscreen panel and then interpreted by a logic 22 operatively coupled thereto;
Step S45, the logic 22 determines the location of the mobile touch-generating device according to the sequence received;
Step S50: logic 22 instructs to emit a signal 27 (e.g., display an image) via suitable interface means 26, e.g., the touchscreen.

Preferably, the signal 27 has characteristics determined according to the last location of the TGD, as determined at step S45. For example, the location of the image in-screen is moved to a location of the photodetector 16, as determined at the touchscreen device. If needed (e.g., the detector is determined to be close to an edge of the screen), the image can be resized, etc.; and Step S70, the above steps of receiving, determining and instructing can be repeated at cycle n+1, etc., as needed.

In addition, the characteristics of the image 27 can be determined (step S50) according to known configuration data of the mobile touch-generating device. The configuration data typically allow for deducing the arrangement of the photodetector of the TGD vs. the TGEs 151-159. For example, the dimensions of the photodetector and the distance and orientation with respect to the TGEs may be required to ensure a match between the displayed image 27 and the photodetector. As evoked earlier, the configuration data may be known, or available.

In variants, the configuration data may be provided to the touchscreen device by the TGD itself, e.g., via a sequence of touch events generated by the mobile device 10, which is then sensed and interpreted at the touchscreen device 20, just like in steps S30-S45. For instance, the configuration data may be provided to the touchscreen device by the TGD via a preliminary sequence of touch events. Still, any sequence of touch events may be characteristic of the relevant configuration, of a particular product, etc.

Next, many schemes can be contemplated for encoding/decoding on each side of the system 1. First, assuming that an image 27 is to be displayed, then flickering code may for instance be used, as known per se. More generally, one or more images can be displayed at the touchscreen panel 26 and decoded at the logic 12. Such images can furthermore be modulated in space (e.g., barcode) and/or in time (e.g., sequence of barcode images). Second, concerning now the touch events, again, many encoding algorithms can be contemplated. Optimal algorithms notably depend on the number of touch-sensitive elements integrated. For instance, on-off keying (i.e., the absence/occurrence of a touch event represents binary logic 0s/1s) can be used when only one TGE is integrated, or used in parallel with several TGEs. More generally, various vocabularies can be designed wherein information words are represented by specific sequences of touch events. Other variants shall be discussed below.

Amongst other applications, the present methods are particularly advantageous for e-banking applications. In that respect, an example of sequence of steps is now discussed, wherein Tn is the nth step implemented at or from the touchscreen device, whereas Dn is the nth step at the TGD.

T1) User starts e-banking session in web browser on the touch-sensitive screen 20 (e.g., a tablet computer);

T2) E-banking web application asks for user authorization of security-sensitive operations (e.g., login or transaction confirmation) by showing a prompt (e.g., "touch the TGD to screen here [showing a rectangle area]");

D1) User activates the TGD (e.g., via power button) and lays it on the touchscreen panel. Alternatively, the device may wake up automatically, e.g., by sensing vibration, movement or even a given signal such as light (e.g., flickering image) emitted by the touchscreen device;

D2) The TGD activates three touch elements, i.e., generates three touch events, like in step S30 of FIG. 1;

T3) The web application senses the location of the TGD and aligns the 'outbound' communications means (bright or dark flickering spots on the screen) with the light-sensitive receivers of the TGD (like in steps S40-S50 of FIG. 1). The geometry of touch sensors vs. light receivers of the TGD is assumed to be known to the web application. As said, the TGD might have informed the touchscreen device of details about its configuration, etc., via a preliminary sequence of touch-events. More generally, the touchscreen device and the TGD may agree on a given protocol, format, etc., during a preliminary exchange. In variants, the protocol, format, configuration, are inherent to the vocabulary used by the TGD when generating the touch-events: the touchscreen device adapts the displayed image accordingly.

T4) The web application begins communicating e-banking security information to the TGD via flickering spots;

D3) The TGD receives information via its photosensitive diodes (diode 16, FIG. 2 or 4);

D4) The TGD decodes (logic 12, FIG. 2 or 4) this information (possibly using a built-in smart card for decryption of the information, see FIG. 2) and shows the information elements meant for user presentation via its display;

D5) The user is prompted for acceptance or rejection of the information shown on the display via an 'Accept' or 'Cancel' button present on the device, see FIG. 2;

D6) The user response is encoded (possibly encrypted using the built-in smart card) and transmitted to the touchscreen device via intermittent touch-events generated by the touch-generating elements;

T5) The touchscreen device receives the response generated in the form of touch events. Depending on the number of touch sensitive areas supported by the touchscreen device and the time permitted, more or less information can be received and passed on to the e-banking web server;

T6) The e-banking server decodes the information received via the web application, possibly decrypts and/or verifies it with user-specific cryptographic keys before granting or refusing access to further operations, depending on the decision of the user and the correctness of the cryptographic keys. Then, it provides feedback to the user (e.g., a green or red display shown on the touchscreen device);

D7) Finally, the user removes the TGD from the touchscreen device.

Some or all of the above steps can be repeated arbitrarily often during a single e-banking session, e.g., first to authorize the login, then to authorize different transactions.

Other secure applications can be contemplated, using a similar philosophy.

Figure 3:
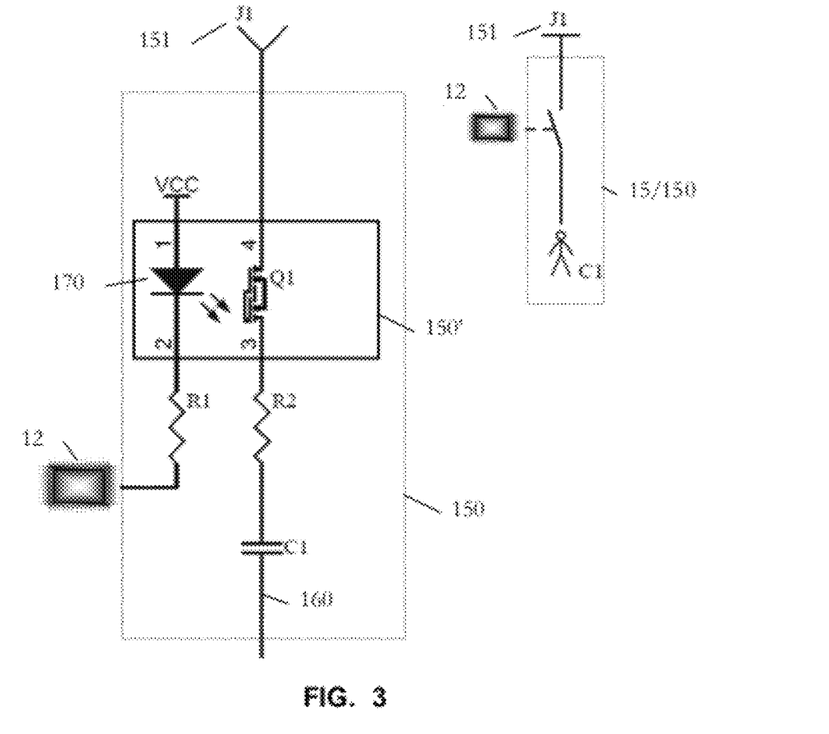
FIG. 3 represents a part of a circuitry connected to a touch-generating element (a conductive electrode), as involved in embodiments.

At present, more details shall be given about a possible embodiment for a suitable touch-generating circuit, in reference to FIG. 3. As the earlier, the mobile TGD includes a touch-generating system with one or more touch-generating elements. A touch-generating element may essentially include a conductive electrode 151. The touch-generating system may furthermore essentially include a circuitry 150. Circuit 150 connects logic 12 to one or more touch-generating elements, such that electrical charge can be drained from an electrode when closing the relevant portion of the circuit pertaining to that electrode, in order to create a (capacitive) touch event.

More in details, in FIG. 3: J1 represents an electrode 151, i.e., the touch generating element at the bottom of the TGD, meant to be placed at or close to a capacitive touch sensitive display. The optically coupled MOSFET (metal-oxide-semiconductor field-effect transistor) 150' used in this example can be considered as a switch between connections 3 and 4 that opens and closes depending on light emitted by the light emitting diode 170 between connections 1 and 2. In other words, it can be regarded as a switch that is switched on or off by light. Here an optical MOSFET is used because it has a very small input capacitance, which means its capacitance at connector 4 is very low if the switch is open. Yet, one could use any suitable device such as e.g., a mechanical solid state relay instead (although the latter might be less practical than an optical MOSFET since it is likely larger). Note that some types of (non optical) transistors typically have a much higher input capacitance, meaning that the touch sensitive display would always detect a touch event independently of whether the switch is open or closed. In other words, an appropriate switch mechanism is tailored to its intended function, i.e., to generate touch events via a touch-generating element, which touch events are detectable by a (typical) touchscreen.

In the example of FIG. 3, the resistor R2 and the capacitor C1 together represent a "human body model", compatible with touch event detection at the touchscreen device. In other words, they are chosen such as to mimic the resistance and capacitance of a human body. The connection 160 is connected to ground. If the switch between 3 and 4 is closed, ground is connected via the human body model to the electrode 151 and the touchscreen detects a touch event (as if a person would touch the screen) as it detects a change in capacitance. The core of the logic 12 triggering the touch events is connected via R1 and pulls this line to ground whenever a touch is to be generated. The core of the logic 12 may for instance be designed partly or wholly in software executing in a microprocessor connected via R1 to the electrode 151, as otherwise depicted in FIG. 2 or 4, in a very simplified version. Yet, in FIG. 2 or 4, the details of circuit 150 (i.e., the essential part of the touch-generating system 15) are not represented. The light emitting diode 170 is then switched on by the logic core when appropriate and the switch between 3 and 4 is closed. The resistor R1 is provided to prevent short-circuits when operating the light emitting diode 170.

A very simple schematic version of the circuit is represented as an inset figure, wherein logic core 12 is shown to actuate a switch. Circuit 150 can be regarded as a switch, connecting the human body model to electrode 151 and actuated by logic core 12. Upon closing the circuit: electrical charge is drained from electrode 151, resulting in the desired capacitive touch event. The later is accordingly detected at the touchscreen device. Typical values for R1, R2 are 750 and 1500 Ohms. A typical value for the capacitance C1 is 100 picofarad. Such values can be adapted depending on the application, the exact characteristics of the electrodes and the touchscreen compatibility contemplated, etc. The scheme of FIG. 3 was made simple on purpose; the skilled reader may acknowledge that the principle illustrated in FIG. 3 can be parallelized to several electrodes, if needed.

Computer program code required to implement at least parts of the above computerized methods may be implemented in a high-level (e.g., procedural or object-oriented) programming language, or in assembly or machine language if desired; and in any case, the language may be a compiled or interpreted language. Suitable processors include general and special purpose microprocessors. Note that operations that the TGD and/or the touchscreen device (and/or possibly a server or any network host involved) performs may be stored on a computer program product tangibly embodied in a machine-readable storage device for execution by a programmable processor; and method steps of the present invention may be performed by one or more programmable processors executing instructions to perform functions of the present invention. In all case, the present invention may encompass not only the TGD but a system including this device, augmented with one or more of the following: a touchscreen device, a server and/or any network host, etc.

More generally, the present invention may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, flash memory or others.

Embodiments have been disclosed, which propose devices and method that extends known display-reading approaches for use with touch-sensitive displays. Some of the described embodiments enable efficient bidirectional data communication while not requiring precise alignment or pre-calibration of the two devices. There are various applications that may benefit from such a very short range wireless communication mechanism, for example, communication with secure tokens for authentication purposes (as described above) and more generally the pairing of devices, etc.

Being able to generate touch events on demand by means of the TGEs has two main advantages. First, it can be used to encode data that needs to be transmitted from the TGD to the touchscreen device into a series of touch events such that the decoding unit of the touchscreen device can reconstruct the data. This way bidirectional communication can be achieved, provided that the TGD can otherwise receive information from the touchscreen device. Second, if the TGD is regularly generating touch events or performs a specific sequence of touch events initially, and if the arrangement of the TGEs allows for reconstructing the position of the photodetector relative to the display (e.g., positioning a TGE in the corners of a triangle), the touchscreen device can automatically position and resize the image(s) on its display such that it matches the position of a photodetector thereon. If this positioning is done regularly, the image(s) can further be relocated automatically. In other words, the user does no longer need to take care of precisely placing the photodetector of the TGD in front of the image(s) displayed. Instead, the touchscreen device automatically aligns the image(s). Therefore the logics 22/12 as shown in FIG. 4 do not only encode/decode data into/from e.g., a flickering image and decode/encode data from/into touch events but they also take care of image positioning on the touchscreen device relative to the received touch events. In addition, a similar mechanism can be used to relay quality information regarding the photodetector's signal input to the touchscreen device. In other words, the touchscreen device can tune the brightness of the display to match the contrast settings required by the photodetector in order to assure good communication without requiring user interaction (e.g., to manually adjust display brightness).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In that respect, many variants are possible, as described below:

For example, to increase the communication bandwidth when encoding data into touch events, the TGD might make use of multiple TGEs and consider the position of the touches within the encoding/decoding algorithm. Depending on the positioning of the TGEs, it may again be necessary to automatically align the two devices as described before; the same techniques can be used.

Additionally, if the touch-sensitive display supports multi-touch (the detection of multiple parallel touch events) this feature might be explored by activating multiple TGEs in parallel. If, for example, eight touch events could be recognized in a single multi-touch event, and a matrix of eight by eight TGEs would be used, 32 bits could be transferred with a single multi-touch thereby increasing data throughput and/or reducing the time of interaction between the paired devices, thus increasing convenience for the user of the devices.

As evoked earlier in reference to FIG. 4, the TGD might be equipped with a light-sensitive, energy-harvesting (i.e., "solar") panel. The solar panel may be used to charge a battery included or, even, the TGD can be powered directly by the light emitted by the display of the touchscreen device, as depicted in FIG. 4, thereby removing the need for a battery within the TGD. Other energy-harvesting means can be envisioned.

Next, the communication between the two devices might be half-duplex or full-duplex.

Also, the touchscreen device might automatically detect the presence of the TGD by detecting a special series of touch events (unlikely to be generated by humans or other unintentional touches), generated by the TGD. Such a series may further be part of a preliminary sequence encoding configuration data, as evoked earlier. The TGD may for example encode an ID that identifies the type of device in cases where multiple variants/models of TGDs exist. The touchscreen device would then adapt the image accordingly.

If the TGD is equipped with at least two TGEs and the touchscreen device knows the physical distance between these TGEs as well as the location of the photodetector relative to the TGEs, the solution is independent of the display resolution as the touchscreen device can calculate the physical size of one pixel and can adapt the image to match the photodetector.

Furthermore, the TGD might be equipped with electrostatically neutral distance holders that guarantee proper vertical (distance) alignment between the paired devices. In addition, these distance holders may have properties to ensure that the TGD cannot easily slip or move on the surface of the touchscreen device's display, e.g., using a technology like geckel's, see e.g., http://www.nature.com/nature/journal/v448/n7151/full/nature05968.html. This way, the TGD can easily be attached to the touchscreen device's display, not move while in operation, even if horizontal forces are applied to the combination of the touchscreen device and the TGD, e.g., in the form of shaking. It can be operated by the user, e.g., pressing a button mounted on the TGD without the danger of changing the relative locations between the touchscreen device and the TGD, and finally, it can be easy to remove by a direct vertical move upward.

The invention claimed is:
1. A mobile touch-generating device comprising:
a logic system;
a photodetector system operatively coupled to the logic system; and
a touch-generating system including one or more touch-generating elements, wherein the touch-generating system is operatively coupled to the logic system, the logic system being configured to generate touch events via said one or more touch-generating elements in response to an optical signal detected via the photodetector system, the touch events being detectable by a touchscreen.

2. The mobile touch-generating device of claim 1, wherein the touch-generating system includes at least two touch-generating elements.

3. The mobile touch-generating device of claim 1, wherein the one or more touch-generating elements include respective conductive electrodes and the touch-generating system includes a circuitry connected to said electrodes via one or more switches, allowing for closing the circuitry and draining electrical charge from said electrodes.

4. The mobile touch-generating device of claim 1, further configured such that the mobile touch-generating device can rest on a touchscreen of a personal digital assistant or PDA, with the touch-generating elements in close proximity with the touchscreen of the PDA.

5. A system comprising:
a touchscreen device having a touchscreen; and
a mobile touch-generating device; such touch-generating device comprising
a logic system;
a photodetector system operatively coupled to the logic system; and
a touch-generating system including one or more touch-generating elements, said touch-generating system operatively coupled to the logic system;
wherein the logic system, in response to an optical signal detected via the photodetector system, configures the touch-generating system to generate, via one or more touch-generating elements thereof, touch events which are detectable by the touchscreen.

6. The system of claim 5, wherein:
the touchscreen device is a personal digital assistant (PDA); and
the mobile touch-generating device is configured such that the mobile touch-generating device can rest on the touchscreen, with the touch-generating elements in close proximity with the touchscreen, and spanning an area smaller than a surface of the touchscreen.

7. The system of claim 6, wherein:
the touchscreen device is configured to display, via the touchscreen, an image modulated in at least one of space and time; and
the system photodetector operatively coupled to the logic of the mobile touch-generating device configured to detect the displayed image, the logic being configured to generate touch events in response to the image detected.

8. A method of bidirectional communication between a mobile touch-generating device and a touchscreen device, wherein the mobile touch-generating device is equipped with a detector system operatively coupled to a logic system of the mobile touch-generating device and wherein the touchscreen device comprises interface means including a touchscreen, the interface means being adapted for communicating with the mobile touch-generating device, the method comprising the steps of:
issuing at least one instruction to emit a signal via said interface means;
generating, by the logic system, touch events using touch-generating elements of the mobile touch-generating device; and
receiving touch events via the touchscreen, wherein touch events are generated in response to the signal detected via the detector system, and said at least one instruction is issued in response to receiving touch events via the touchscreen.

9. The method of claim 8, further including, at a cycle n:
receiving via the touchscreen an $n^{th}$ sequence of touch events generated by the mobile touch-generating device and indicative of an $n^{th}$ location of the touch-generating elements;
determining an $n^{th}$ location of the mobile touch-generating device according to the $n^{th}$ sequence of touch events received;
issuing at least one instruction to emit an $n^{th}$ signal via said interface means, the $n^{th}$ signal having an $n^{th}$ set of characteristics determined according to the $n^{th}$ location of the touch-generating elements; and
repeating the steps of receiving, determining and issuing instructions at a cycle n+1.

10. The method of claim 9, wherein issuing at least one instruction to emit a signal comprises issuing at least one instruction to display an image via the touchscreen, the image modulated in space and/or in time.

11. The method of claim 10, wherein issuing at least one instruction to emit a signal comprises issuing at least one instruction to emit a signal having a set of characteristics determined according to both a last determined location and known configuration data of the mobile touch-generating device, said configuration data indicating the arrangement of the detector system versus the one or more touch-generating elements of the touch-generating system.

12. The method of claim 11, further including a step of receiving configuration data pertaining to a configuration of the mobile touch-generating device, said configuration data indicating the arrangement of the detector system versus the one or more touch-generating elements of the touch-generating system, and wherein receiving configuration data comprises:
receiving via the touchscreen a sequence of touch events generated by the mobile touch-generating device; and
determining the configuration of the mobile touch-generating device according to said sequence received.

13. A computer program product comprising a computer readable non-transitory medium having computer readable program code embodied therein or thereon, the computer readable program code being configured to cause a processing circuit to perform instructions executable by processing circuit for executing a method of bidirectional communication between a mobile touch-generating device and a touchscreen device, wherein the mobile touch-generating device is equipped with a detector system operatively coupled to the processing circuit of the mobile touch-generating device and wherein the touchscreen device comprises interface means including a touchscreen, the interface means being adapted for communicating with the mobile touch-generating device, the method comprising the steps of:
issuing at least one instruction to emit a signal via said interface means; and
generating, by the processing circuit, touch events using touch-generating elements of the mobile touch-generating device;
receiving touch events via the touchscreen, wherein touch events are generated in response to a signal detected via the detector system, and said at least one instruction is issued in response to receiving touch events via the touchscreen.

* * * * *